United States Patent
Posar

[11] Patent Number: 5,888,368
[45] Date of Patent: Mar. 30, 1999

[54] PROCESS FOR MANUFACTURING AN AQUEOUS SODIUM HYDROXIDE SOLUTION

[75] Inventor: Francesco Posar, Rosignano-Solvay, Italy

[73] Assignee: Solvay (Société Anonyme), Bruseels, Belgium

[21] Appl. No.: 959,854

[22] Filed: Oct. 29, 1997

[30] Foreign Application Priority Data

Oct. 31, 1996 [IT] Italy .................................. MI96A2273

[51] Int. Cl.$^6$ .................................................. B01D 61/44
[52] U.S. Cl. .......................... 204/537; 204/538; 205/510; 205/512; 205/514
[58] Field of Search .................................. 204/537, 538; 205/510, 512, 514

[56] References Cited

U.S. PATENT DOCUMENTS

| | | |
|---|---|---|
| 4,238,305 | 12/1980 | Gancy et al. . |
| 4,592,817 | 6/1986 | Chlanda et al. . |
| 4,636,289 | 1/1987 | Mani et al. ............................. 204/538 |
| 5,308,455 | 5/1994 | Bourgeois . |
| 5,395,497 | 3/1995 | Bourgeois . |

FOREIGN PATENT DOCUMENTS

| | | |
|---|---|---|
| 0124007 | 11/1984 | European Pat. Off. . |
| 0560422 | 9/1993 | European Pat. Off. . |
| 0577207 | 1/1994 | European Pat. Off. . |
| 96/01286 | 1/1996 | WIPO . |

Primary Examiner—Arun S. Phasge
Attorney, Agent, or Firm—Venable; George H. Spencer

[57] ABSTRACT

Process for manufacturing sodium hydroxide by the electrodialysis of sodium carbonate in an electrodialysis cell having three compartments, in which an aqueous sodium carbonate solution is introduced into a compartment of the cell which is bounded between two cationic membranes, an acid is introduced into a compartment which is bounded between one of the cationic membranes and a cationic face of a bipolar membrane, and an aqueous sodium hydroxide solution is removed from a compartment which is adjacent to an anionic face of the bipolar membrane.

10 Claims, 1 Drawing Sheet

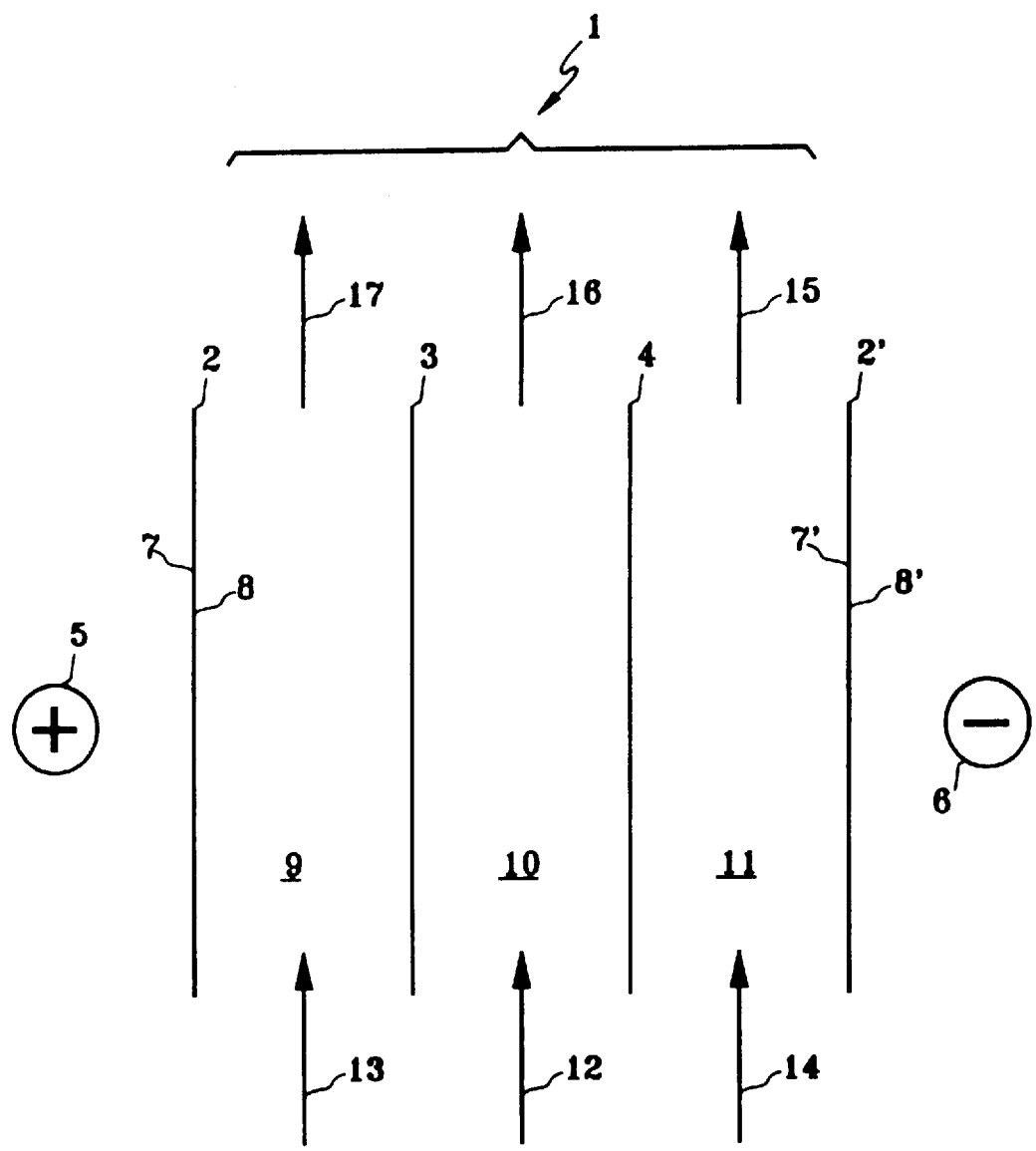

PROCESS FOR MANUFACTURING AN AQUEOUS SODIUM HYDROXIDE SOLUTION

The invention relates to the manufacture of sodium hydroxide by the electrodialysis of sodium carbonate.

Electrodialysis is a well-known technique for manufacturing aqueous sodium hydroxide solutions. Thus U.S. Pat. No. 4,238,305 describes a process in which use is made of an electrodialysis cell of the type having two compartments, these being bounded between a cationic membrane and a bipolar membrane, and an aqueous sodium carbonate solution is electrodialysed in that compartment of the cell which is bounded between the cationic membrane and the cationic face of the bipolar membrane. Electrodialysis of the aqueous sodium carbonate solution leads to the formation of an aqueous sodium hydroxide solution in the basic compartment of the cell, which is adjacent to the anionic face of the bipolar membrane. In this known process, the electrodialysis conditions are chosen so as to produce an acid pH in that compartment of the cell which is fed with the sodium carbonate solution. It follows that carbon dioxide is generated in this compartment.

In the known process described above, the formation of gaseous carbon dioxide in the electrodialysis cell constitutes a drawback. This is because the bipolar membrane used in this known process is generally formed by the juxtaposition of an anionic membrane and a cationic membrane, so that the evolution of carbon dioxide at its contact inevitably causes a dislocation of the bipolar membrane by separation of its anionic and cationic components.

In order to remedy this drawback, it has been proposed in European Patent EP-B-560,422 to produce an alkaline pH in the compartment fed with the sodium carbonate solution in order to prevent the formation of carbon dioxide therein. Although this known process appreciably reduces the stresses on the bipolar membrane, in practice it has nevertheless proved difficult to completely prevent carbon dioxide from forming locally, in particular in the pores of the bipolar membrane.

The invention is intended to provide an improved process for the manufacture of sodium hydroxide by the electrodialysis of sodium carbonate in a cell equipped with a bipolar membrane, this process being particularized in that it avoids the formation of gaseous carbon dioxide in contact with the bipolar membrane.

The invention therefore relates to a process for manufacturing sodium hydroxide by the electrodialysis of sodium carbonate, which is characterized in that an electrodialysis cell having three compartments is employed, an aqueous sodium carbonate solution is introduced into a compartment of the cell which is bounded between two cationic membranes, an acid is introduced into a compartment which is bounded between one of the cationic membranes and a cationic face of a bipolar membrane, and an aqueous sodium hydroxide solution is removed from a compartment which is adjacent to an anionic face of the bipolar membrane.

The electrodialysis cell used in the process according to the invention is of a type having three compartments, these being bounded between two cationic membranes and one bipolar membrane. The electrodialysis cell is placed between an anode and a cathode which are connected respectively to the positive terminal and to the negative terminal of a DC power supply. The anode and cathode are arranged in such a way that the anionic face of the bipolar membrane is turned towards the anode while the cationic face of the bipolar membrane is turned towards the cathode.

In practice, several (at least two, by generally several tens) of electrodialysis cells are combined in series between the anode and the cathode, so as to constitute an industrial electrodialyser.

Cationic membrane is understood to mean a thin film which is non-porous with respect to the aqueous electrolytes, selectively permeable to the cations and impermeable to the anions.

The bipolar membrane used in the process according to the invention is a membrane which, on one face, exhibits the properties of a cationic membrane and, on the other face, the properties of an anionic membrane (an anionic membrane being, by definition, a thin film which is non-porous with respect to the aqueous electrolytes, selectively permeable to the anions and impermeable to the cations). In the process according to the invention, it is preferred to use a bipolar membrane formed by the juxtaposition of a cationic membrane and an anionic membrane, for example of the type described in International Application WO 96/01286 [SOLVAY (Société Anonyme)].

According to the invention, an aqueous sodium carbonate solution is introduced into that compartment of the electrodialysis cell which is bounded between the two cationic membranes and an acid is introduced into that compartment of the cell which is bounded between one of the two cationic membranes and the cationic face of the bipolar membrane.

The aqueous sodium carbonate solution may be a dilute solution or a concentrated solution. It is preferred to use a concentrated solution, preferably a solution which is more or less saturated with sodium carbonate. The sodium carbonate solution may optionally contain dissolved sodium bicarbonate.

The acid must be an electrolyte. Furthermore, it is advisable to select an acid which, under the normal conditions of sodium carbonate electrodialysis, does not generate a gas. According to the invention, the acid is advantageously selected from inorganic acids. Hydrochloric acid is eminently suitable. Carbonic acid is not suitable within the scope of the invention.

The electrodialysis causes, in a manner known per se, dissociation of the water in the bipolar membrane and decomposition of the sodium carbonate.

In the process according to the invention, the compartment containing the anionic face of the bipolar membrane may optionally be fed with water or with a dilute sodium hydroxide solution, for example a solution containing from 0.5 to 5 mol (preferably from 1 to 2 mol) of sodium hydroxide per litre.

In the process according to the invention, the acid does not participate in the electrodialysis reaction. It constitutes a barrier which prevents carbon dioxide, which would be formed in the sodium carbonate solution, from reaching the bipolar membrane. The acid may be an immobile film in the compartment. However, it is preferred to make the acid circulate through the compartment continuously, for example in a loop between the cell and an acid reservoir.

In the process according to the invention, the pH in the compartment fed with the aqueous sodium carbonate solution may be acid, alkaline or neutral. It is preferred to produce an alkaline pH in this compartment, for example a pH equal to 7.5, values ranging from 7.5 to 12 being very suitable and those lying between 9 and 11 being especially advantageous. In general, the optimum pH conditions in this compartment of the electrodialysis cell may be easily determined, from electrochemical theory or from routine laboratory tests, and in particular comprise a suitable choice of the concentration of the sodium carbonate solution and of its flow rate.

The pH in the acid compartment is preferably less than the pH in the sodium carbonate solution compartment. The pH in the acid compartment is advantageously less than 6, preferably less than 5, pH values ranging from 0 to 2 being very suitable, those lying between 0 and 0.5 being especially recommended. The optimum pH value in the compartment fed with the acid may be easily achieved by appropriate selection of the acid and its concentration. Aqueous hydrochloric acid solutions are very suitable, molar solutions being especially advantageous.

In one particular embodiment of the process according to the invention, the acid is selected from water-soluble oxyacids. By definition, oxyacid is the generic name of inorganic acids containing oxygen (DUVAL, "Dictionnaire de la chimie et de ses applications, 3e édition, 1978, Techniques et Documentation" [*Dictionary of chemistry and its applications, 3rd Edition, 1978, Techniques and Documentation*], *Paris, page* 783). In this embodiment of the process according to the invention, the oxyacid is preferably selected from those in which the anion has an ion diameter greater than 1.8 Å, which is the ion diameter of the chloride anion. Selecting a hydracid having a large anion reduces the risk of migration of the said anion through the bipolar membrane towards the sodium hydroxide solution. Sulphuric acid and nitric acid (the anion of which has a diameter greater than 2.0 Å) are especially advantageous, sulphuric acid being preferred.

In another embodiment of the process according to the invention, the sodium carbonate solution is obtained by dissolving sodium sesquicarbonate in water. In this embodiment of the process according to the invention, the source of sesquicarbonate is advantageously trona, for example trona extracted from a vein in the State of Wyoming in the United States.

BRIEF DESCRIPTION OF THE DRAWING

Particular features and details of the invention will emerge from the following description of the single FIGURE of the appended drawing, which represents diagrammatically an electrodialysis cell for implementing the process according to the invention.

The cell shown in the figure, denoted in its entirety by the reference notation 1, comprises a bipolar membrane 2 and two cationic membranes 3 and 4 between an anode 5 and a cathode 6. The bipolar membrane 2 has an anionic face 7 and a cationic face 8. It is positioned in the cell so as to have its cationic face 8 turned towards the cathode 6. The cationic membranes 3 and 4 are placed between the bipolar membrane 2 and the cathode 6. The cells thus comprises three electrodialysis compartments 9, 10 and 11 (the compartment 11 being bounded by the anionic face 7' of the bipolar membrane 2' of an adjacent cell).

During operation of the cell 1, the anode 5 is connected to the positive terminal of a DC power supply and the cathode 6 is connected to the negative terminal of the said power supply. An aqueous sodium carbonate solution 12 is introduced into the compartment 10, a molar aqueous hydrochloric acid solution 13 is introduced into the compartment 9 and water or a dilute sodium hydroxide solution 14 is introduced into the compartment 11. Due to the effect of the voltage between the electrodes 5 and 6, water is dissociated in the bipolar membranes 2 and 2' so that protons pass into the acid compartment 9 and hydroxyl ions pass into the compartment 11. Simultaneously, sodium carbonate is decomposed in the compartment 10 and $Na^+$ cations pass through the cationic membrane 4 into the compartment 11. An aqueous sodium hydroxide solution 15 is removed from the compartment 11 of the cell and an aqueous sodium carbonate and sodium bicarbonate solution 16 is removed from the compartment 10. Moreover, a hydrochloric acid solution 17 is removed from the acid compartment 9. The composition of the acid solution 17 is more or less the same as that of the solution 13. The acid solution 17 is recycled into the solution 13, which thus circulates in a closed circuit. It may happen that carbon dioxide (coming from the decomposition of sodium carbonate) escapes from the compartment 10. The compartment 9 containing the acid forms a screen between the bipolar membrane and the carbon dioxide which is formed in the sodium carbonate solution undergoing decomposition. In this way, deterioration of the bipolar membrane is avoided.

The following examples serve to illustrate the invention.

EXAMPLE 1

(reference example)

A cell of the type having two compartments was employed, these compartments being bounded between a cationic membrane and two bipolar membranes located respectively on either side of the cationic membrane (the bipolar membranes being placed in the cell so as to have their cationic face turned towards the cathode). The surface area of each of the bipolar membranes was 7 $cm^2$. The compartment defined between the cationic membrane and the anionic face of one of the bipolar membranes was fed with demineralized water and the other compartment was fed with an aqueous sodium carbonate solution (containing approximately from 100 to 120 g of $Na_2CO_3$ per kg and from 10 to 30 g of $NaHCO_3$ per kg). An approximately uniform temperature of 50° C. was maintained in the cell and the electrodialysis was carried out at a current density of 1.5 kA per $m^2$ of surface area of each bipolar membrane. The potential difference between the two faces of each of the bipolar membranes was measured over time by means of Luggin capillaries. The results of the measurements are given in the table below, the two bipolar membranes being denoted therein respectively by "Membrane 1" and "Membrane 2".

|      | Potential (V) ||
| Days | Membrane 1 | Membrane 2 |
| --- | --- | --- |
| 1 | 1.69 | 1.35 |
| 21 | 1.87 | 1.70 |
| 58 | 3.03 | 2.36 |
| 97 | 5.43 | 2.60 |

EXAMPLE 2

(in accordance with the invention)

In this example, in accordance with the invention, a cell of the type having three compartments was employed, these being bounded between a bipolar membrane and two cationic membranes located respectively on either side of the cationic membrane (the bipolar membrane being placed in the cell so as to have its cationic face turned towards the cathode). The surface area of the bipolar membrane was 7 $cm^2$. The compartment having the anionic face of the bipolar membrane was fed with demineralized water, the compartment having the cationic face of the bipolar membrane was fed with an aqueous hydrochloric acid solution (4% by weight) and the third compartment was fed with an aqueous sodium carbonate solution (containing approximately from 100 to 120 g of $Na_2CO_3$ per kg and from 10 to 30 g of $NaHCO_3$ per kg). An approximately uniform temperature of 50° C. was maintained in the cell and the electrodialysis carried out at a current density of 1.5 kA per $m^2$ of surface area of the bipolar membrane. As in Example 1, the potential difference between the two faces of the bipolar membrane was measured by means of Luggin capillaries. The results of the measurements are given in the table below.

| Days | Potential (V) |
|------|---------------|
| 1    | 1.20          |
| 102  | 1.25          |

Comparing the results of Examples 1 and 2 immediately shows the progress made by the invention with regard to the voltage in the bipolar membranes.

I claim:

1. A process for manufacturing sodium hydroxide by the electrodialysis of sodium carbonate, wherein an electrodialysis cell having three compartments is employed, an aqueous sodium carbonate solution is introduced into a compartment of the cell which is bounded between two cationic membranes, an acid is introduced into a compartment which is bounded between one of the cationic membranes and a cationic face of a bipolar membrane, and an aqueous sodium hydroxide solution is removed from a compartment which is adjacent to an anionic face of the bipolar membrane.

2. The process according to claim 1, wherein an alkaline pH is employed in the compartment into which the sodium carbonate solution is introduced.

3. The process according to claim 2, wherein a pH of from 9 to 11 is employed in the compartment into which the sodium carbonate solution is introduced and a pH of from 0 to 0.5 is employed in the compartment into which the acid is introduced.

4. The process according to claim 1, wherein the aqueous sodium carbonate solution contains sodium bicarbonate and is obtained by dissolving sodium sesquicarbonate in water.

5. The process according to claim 4, wherein the sodium carbonate solution is obtained by dissolving trona in water.

6. The process according to claim 1, wherein an aqueous hydrochloric acid solution is used as the acid.

7. The process according to claim 1, wherein the acid is selected from water-soluble oxyacids.

8. The process according to claim 7, wherein an oxyacid is selected, in which the anion has an ion diameter greater than 1.8 Å.

9. The process according to claim 8, wherein the acid is selected from the group consisting of sulphuric acid and nitric acid.

10. The process according to claim 1, wherein a bipolar membrane obtained by juxtaposition of an anionic membrane and a cationic membrane is employed.

* * * * *